United States Patent [19]
Kugimiya et al.

[11] 3,931,642
[45] Jan. 6, 1976

[54] MAGNETIC HEAD AND METHOD OF MAKING THE SAME

[75] Inventors: Koichi Kugimiya, Toyonaka; Eiichi Hirota, Hirakata, both of Japan

[73] Assignee: Matsushita Electric Industrial Co., Ltd., Osaka, Japan

[22] Filed: June 15, 1973

[21] Appl. No.: 370,451

[30] Foreign Application Priority Data

June 20, 1972 Japan.............................. 47-62179
Feb. 9, 1973 Japan.............................. 48-16973
Feb. 9, 1973 Japan.............................. 48-16975
Feb. 9, 1973 Japan.............................. 48-16980

[52] U.S. Cl.............. 360/127; 29/603; 29/DIG. 31; 360/122
[51] Int. Cl.²..................... G11B 5/14; G11B 5/221
[58] Field of Search .......... 360/122, 125, 126, 127; 29/DIG. 31, 603, 604; 148/105, 126, 131

[56] References Cited
UNITED STATES PATENTS

| | | | |
|---|---|---|---|
| 2,992,474 | 7/1961 | Adams et al...................... | 360/126 |
| 3,663,767 | 5/1972 | Shimotori......................... | 360/122 |
| 3,676,610 | 7/1972 | Moss et al........................ | 360/125 |

*Primary Examiner*—Alfred H. Eddleman
*Attorney, Agent, or Firm*—Wenderoth, Lind & Ponack

[57] ABSTRACT

This invention provides a magnetic head constituted by a magnetic core having a winding wound thereon, the magnetic core being a ferrite body composed of crystallites which have (111)-crystallographic planes thereof oriented substantially parallel with each other. The ferrite body is a dense polycrystalline and has much improved wear characteristics. The method of manufacturing the polycrystalline ferrite body includes the steps of mixing starting materials which include an $\alpha\text{-Fe}_2\text{O}_3$ powder with particles having a thin disc shape and other compounds in the weight ratio of given ferrite composition, cold-pressing the mixture into a cold-pressed body by a uniaxial pressure and sintering the cold-pressed body into a solid body so that the crystallites of the sintered body have the (111) 111)-planes substantially oriented.

21 Claims, 4 Drawing Figures

MAGNETIC HEAD AND METHOD OF MAKING THE SAME

This invention relates to magnetic heads comprising polycrystalline ferrite materials and more particularly to an improvement of the mechanical properties of magnetic heads which contact magnetic recording media, such as magnetic tapes and magnetic drums, under pressure during operation of recording and reproducing apparatus.

Contact type magnetic heads heretofore have had short lives because the surfaces of the magnetic heads are severely worn by recording media. Therefore, magnetic heads consisting essentially of ferrite materials in a polycrystalline form or in a single crystal form have been developed for improving the operational lives of contact type magnetic heads by utilizing the mechanically hard nature of ferrite materials. Among ferrite heads single crystal heads exhibit wear characteristics which are superior to those of polycrystalline heads, if the front surfaces of the single crystal heads are oriented in suitable crystal planes and crystal directions.

Wear characteristics of a single crystal in general depend on which crystallographic plane of the single crystal an abrasive medium contacts and in which crystallographic direction of a single crystal an abrasive medium slides.

With respect to wear characteristics of a single crystal ferrite the (111)-crystallographic plane and equivalent planes of the single crystal ferrite have poorer wear resistance than the (110)- or (100)-crystal planes and their equivalent planes.

More precisely, even in the (110) plane the crystallographic direction <110> exhibits remarkably poorer wear resistance than the <001> direction. This fact, in turn, makes clearer that in making magnetic heads with superior wear resistance a tedious step of precise orientation of the single crystal is required so that the desirable plane and direction are exactly in the front surface of the heads.

On the other hand magnetic heads made of dense polycrystalline ferrites are superior to the single crystal heads in ease of fabrication and in magnetic characteristics at high frequency because dense polycrystalline ferrites are homogenenous are are made easily by selecting the composition of the ferrite so as to result in superior magnetic characteristics.

However, contact type heads made of polycrystalline ferrites have a problem in that the material crumbles during use. When a ferrite head contacts a recording medium which has a rough and hard surface, the front surface of the head crumbles and this decreases severely the output of the head.

An object of this invention is to provide magnetic heads comprising a dense polycrystalline ferrite body having improved wear characteristics.

Another object of the invention is to provide magnetic heads comprising a dense polycrystalline ferrite body having improved resistance to crumbling.

A further object of this invention is to provide a method for making a crystal oriented dense polycrystalline ferrite body having suitable physical properties for contact type magnetic heads.

These and other objects and features of this invention will be apparent upon consideration of the following description together with the accompanying drawings, wherein.

The present invention provides a magnetic head comprising a magnetic core having a winding wound thereon, said magnetic core consisting essentially of a ferrite body composed of crystallites which have the (111)- crystallographic planes thereof substantially oriented in parallel with each other.

In this invention the words "substantially oriented (111)-planes" are to be understood as follows. "Substantially oriented (111)-planes" means planes oriented in the same direction as the <111> direction which corresponds to a crystallographic axis. A material which has a texture like the ones in the present invention, which can be analogized to a fiber texture, consists of crystallites, each crystallite having one common crystallographic direction, the <111>-direction in the present invention, substantially parallel to another common direction, analogous to the fiber axis, throughout the material. Since the ferrites in the present invention crystallographically have a cubic structure and the eight crystallographic directions are exactly equivalent to the <111>-direction in the crystal structure, the <111>-direction is to be understood as being any one of the eight equivalent directions and, that direction and the opposite direction thereto are parallel to the fiber axis and other six directions not parallel to the fiber axis.

In this application, the use of the words "fiber texture" and "fiber axis" is intentionally avoided since they are likely to give a false idea that the ferrite in the present invention consists of a bundle of fibers and the axes of the fibers coincide substantially with the fiber axis. It should be again noted that the ferrite in the present invention is a ferrite body composed of crystallites which have the (111)-crystallographic planes thereof substantially oriented in parallel with each other.

In accordance with the invention the ferrite head the front surface of which is perpendicular to the substantially oriented (111)-planes of said ferrite has better wear-resistance than heads made of a conventional dense polycrystalline ferrite.

Figure 1:
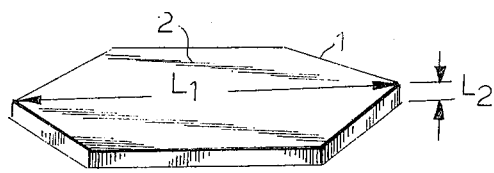
FIG. 1 is a perspective view of the ideal shape of an $\alpha$-$Fe_2O_3$ powder which is used as one of constituents according to this invention.
Figure 2:
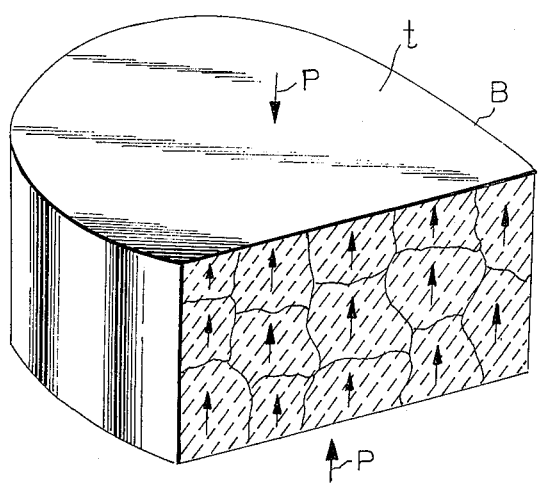
FIG. 2 is a schematic perspective view, partially sectioned, of a body of ferrite formed by pressing and sintering powder having particles as shown in FIG. 1, the crystallites of the body being shown on an enlarged scale.

It has been discovered that the oriented polycrystalline ferrite body of the present invention can be manufactured by mixing starting materials which consist of $\alpha$-$Fe_2O_3$ powder having individual particles in the shape of a thin hexagonal disc as shown in FIG. 1 and other compounds in a weight ratio of a given ferrite composition, pressing the mixture into a pressed body by uniaxial pressure as indicated by the arrows P in FIG. 2, and finally sintering said pressed body into a solid body B as seen in FIG. 2.

The α-Fe₂O₃ powder (hereinafter designated MIO) having this particular crystalline shape as shown in FIG. 1 is obtained by the hydro-thermal treatment of α-FeOOH powder immersed in alkali solutions. Depending on the history of the synthesis of α-FeOOH and the hydro-thermal condition, the size of the particles of MIO powder differs, but the distribution of the grain size is narrow. The MIO powder generally has an average diameter $L_1$ (grain size) ranging between $0.1\mu$ and $60\mu$ and an average diameter $L_1$ to thickness $L_2$ ratio ranging between 3/1 and 30/1. The disc face 2 of the MIO powder 1 is ideally hexagonal, but many grains of the powder actually have an irregular shape.

The disc face 2 of the MIO powder particles coincides with the crystallographic c-plane of an α-Fe₂O₃ crystal. It is suitable for one of the starting materials of the present invention that the powder have an average grain size smaller than $60\mu$ for obtaining a well-oriented polycrystalline ferrite body. A preferable average grain size for the particles of the MIO powder ranges between $0.1\mu$ to $30\mu$ and an optimum average grain size ranges between $0.5\mu$ and $15\mu$. The thickness ratio of the MIO powder is preferably larger than 5/1 and the amount of the MIO powder by weight is preferably not less than 55% of that of the starting materials for obtaining a well oriented polycrystalline ferrite body.

It is also preferable for the superior orientation according to the invention to select at least one of the starting materials from a group consisting of γ-MnOOH, α-FeOOH, Co(OH)₂, Mg(OH)₂ and Ni(OH)₂ depending on the desired composition. The decomposition products formed by heating the materials of the above group are also useful for the present invention, provided that the decomposition does not change the shape of the powder particles.

It has been found that the grain sizes of the starting materials other than the MIO powder and materials selected from the group above are preferably smaller than the size of the particles of the MIO powder and the material from the above group and that the amount of the ingredients by weight is preferably less than 35 percent of the total amount of the starting materials to obtain satisfactory orientation. In accordance with this invention the starting materials which are weighed out in a desired ferrite composition are mixed with water or alcohol in an amount preferably more than that of the starting materials into a homogeneous mixture. The mixture is put into a die and pressed into a desired shape by a uniaxial pressure. In this pressed body, disc faces 2 of the MIO powder orient substantially perpendicular to the direction of the uniaxial pressure.

The pressed body is heated to a high temperature and is sintered into a dense sintered body and thereafter cooled down to room temperature, whereby a (111)-plane oriented ferrite body B is obtained.

The (111)-plane oriented ferrite body B consists of crystallites C the (111)-crystal planes of which orient substantially perpendicular to the pressing direction as indicated by arrows P in FIG. 2. The (111) crystal planes are thus parallel to the top and bottom surfaces $t$ and $b$ of body B.

Figure 3:
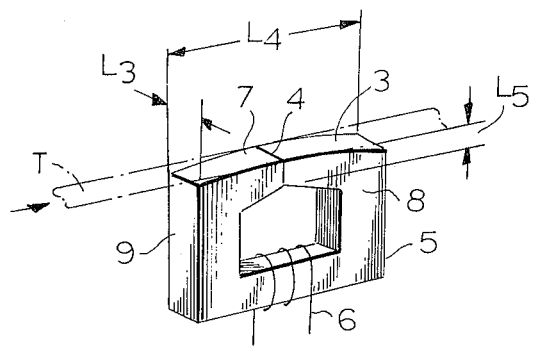
FIG. 3 is a perspective view of a ferrite magnetic head formed from the body of FIG. 2.

In the process of mixing the starting materials, it is found that even without using water or alcohol an oriented pressed body, as shown schematically in FIG. 3, is obtained. For obtaining a denser sintered body it is effective to further compact the pressed body to a denser body with no observable change of the orientation by applying a high hydraulic pressure (isostatic) thereto.

It has been further found that a dense well-oriented sintered ferrite body is obtained by hot-pressing said pressed body by applying a uniaxial pressure the direction of which coincides with a direction perpendicular to the substantially oriented disc faces of the MIO powder, namely, in the pressing direction for molding said mixture. Furthermore, for increasing the degree of orientation of the crystallites it is preferable to sinter at the optimum condition, namely, a proper sintering temperature (e.g. 1000° to 1400°C), a proper sintering period (e.g. 0.5 to 10 hours), a proper pressure (e.g. higher than 50 kg/cm²) and so forth, so as to obtain a sintered body having an average grain size at least 2-times larger than that of the starting MIO powder. The degree of orientation of substantially oriented (111)-crystal planes is measured by an X-ray diffraction method, in which the substantially oriented (111)-crystal planes are exposed to $FeK_\alpha$ radiation, and defined by the following equation:

$$Q = \{I_{mmm}/I_{total} - I°_{mmm}/I°_{total}\}/\{1 - I°_{mmm}/I°_{total} \times\} 100(\%)$$

where $$I_{mmm} = \sum_h I(hhh), \quad I_{total} = \sum_{klm} I\uparrow(klm),$$

and $I\uparrow(klm)$ and $I(hhh)$ indicate integrated intensities of diffraction lines directed from (klm)- and (hhh)-crystal planes, respectively, which give diffraction lines at a diffraction angle less than $2\theta = 85°$, and $I°_{mmm}$ and $I°_{total}$ indicate corresponding quantities of a homogeneous isotropic polycrystalline ferrite body. A preferable value of Q according to the present invention is larger than 70% and more preferably larger than 90%.

Figure 4:
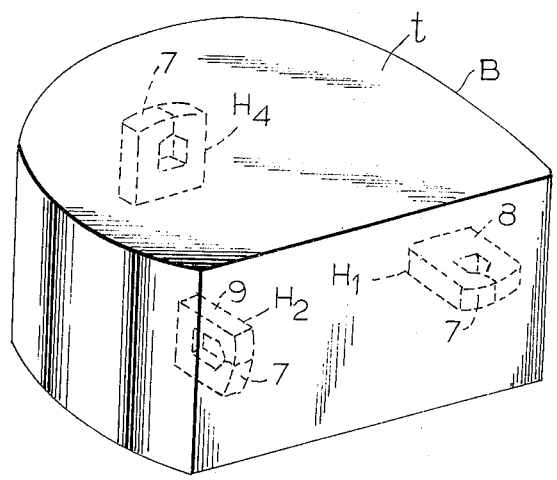
FIG. 4 is a schematic view showing the manner of forming magnetic heads from the body of FIG. 3 with the respective surfaces adapted to be contacted by a recording medium oriented in different directions relative to the (111) crystallographic planes of the crystallites in said body.

The (111)-plane oriented dense ferrite body B is then machine-worked and glass-bonded by a conventional technique to form a magnetic head core as shown in FIG. 3, the front surface of which is perpendicular to the substantially oriented (111)-planes as shown at $H_1$ and $H_2$ in FIG. 4.

In these figures a magnetic head 3 is composed of a head core 5 made of the (111)-plane oriented dense ferrite body, an acting magnetic gap 4 made of a glass, a front surface 7 which contacts a recording medium, such as a tape T, during use, and a winding 6. In these heads the substantially oriented (111)-planes are perpendicular to the front surface 7, and in $H_1$ the side surface 8 is parallel to the substantially oriented (111)-planes, and in $H_1$ the end face 9 is parallel to the substantially oriented (111)-planes. The wear resistance of these heads is improved by about two-fold in comparison with that of a magnetic core made of a conventional dense sintered ferrite.

In these two figures, surfaces 8 and 9 are shown as being substantially perpendicular to the front surface 7 for the sake of easier understanding of the concept of the structure of the head. In actual heads, however, the surfaces 8 and 9 are not necessarily substantially perpendicular to the front surface 7. For instance, side views of the surfaces 8 and 9 can have the shape of parallelograms or trapezoids. Also, in actual heads, the front surface 7 generally has a curvature. Thus, the phrase "substantially parallel to the front surface" is to be understood to mean that a flat plane tangential to the front surface of the head lies within about 10° from the plane which is tangent to the front surface of the head at the magnetic gap. The phrase "substantially perpendicular to the front surface" means perpendicular to the front surface of the heads with the tolerance of about 10°.

The test method for evaluating the wear resistance of the head is as follows: Referring to FIG. 2, the magnetic head core 5 having a core width $L_3$ of 0.2mm and a core length $L_4$ of 2.0mm is attached to a conventional video tape recorder and is run at a speed of 12m/s relative to a chromium dioxide tape. The relative position of the head and the tape T is adjusted so that the test tape contacts the test head at the highest pressure at the magnetic gap. After 100 hours of the testing, the height $L_5$ of the magnetic gap is measured and the wear resistance is evaluated according to the expression $(1-L_5L_5^°)^{-1}$, where $L_5^°$ is the initial height of the magnetic gap.

According to this invention the material crumbling problem of the prior art polycrystalline ferrite heads is alleviated by employing the present (111)-plane oriented polycrystalline ferrite in a magnetic core $H_4$ as shown in FIG. 4. In this figure the front surface 7 is parallel to the substantially oriented (111)-planes of the present (111)-plane oriented polycrystalline ferrite. The resistance of the head to material crumbling is tested by comparing it with that of a head made of a conventional dense polycrystalline ferrite. The test method used here is as follows: Magnetic heads having the dimensions described above are rubbed by a $\gamma$-$Fe_2O_3$ tape running at a relative speed of 12m/s. After 300 hours of testing, the number and an average size of defects which occur on the front surfaces of the tested heads are measured. The tested head exhibited remarkably fewer defects both in number and in size compared with those which occur in conventional ferrite heads.

From the description above, it is apparent that only the front surface 7 is important to the wear characteristics of the magnetic head. Therefore, it is necessary that at least a portion of the front surface 7 be made of the present (111)-plane oriented polycrystalline ferrite.

The following are non-limitative illustrative examples of presently preferred embodiments of this invention:

EXAMPLE 1

Starting materials of 164g of MIO and 46.5g of $\gamma$-MnOOH, 39.0g of ZnO were mixed with 500cc of water. The mixture was then molded into a disc (pressed body) 36mm in diameter and 25mm in height with a uniaxial pressure of 500kg/cm$^2$.

Grain sizes of the MIO powder were between 4$\mu$ and 16$\mu$ and mostly between 8$\mu$ and 12$\mu$ and the average grain size was about 10$\mu$. The ratio of diameter to thickness of the MIO powder was 15/1 15on the average. The average grain size of the $\gamma$-MnOOH was about 1$\mu$ and that of the ZnO was less than 0.2$\mu$. The particles of $\gamma$-MnOOH powder had a strip shape and a ratio of the length to the width of about 10. To figure out the average grain size of the $\gamma$-MnOOH, the length of the powder particles was measured. The particles of ZnO powder had an irregular shape. The pressed body was inserted in a die made of silicon nitride while being embedded in alumina powder having an average particle size of about 80$\mu$ and was then heated in an electrical furnace equipped with a press. The pressed body was held at a temperature of 1200°C for 1 hour and subsequently at a temperature of 1350°C for 3 hours while being hot-pressed with a pressure of 300kg/cm$^2$ for the final 2.5 hours of the 1350°C heating period. It was hot-pressed with a uniaxial pressure. The direction of the uniaxial pressure was the same as that of the uniaxial pressure of molding the pressed body.

Finally the hot-pressed body was furnace-cooled to room temperature without pressure. The resultant hot-pressed body had a porosity of less than 0.1% by volume, an average grain size of about 100$\mu$ and a degree of (111)-orientation Q of 100%.

EXAMPLE 2

A magnetic head $H_2$ was made in the aforesaid shape by slicing, polishing and glass-bonding the hot-pressed oriented polycrystalline ferrite obtained in Example 1. The front surface 7 of the head $H_2$ was perpendicular to the substantially oriented (111)-crystalline planes and the running direction of the magnetic recording media was parallel to the substantially oriented (111)-planes in the material of the head as shown in FIG. 4. The wear resistance of the head was about 5.9 which is very high as compared with a value of 3.8 for a magnetic head made of a conventional hot-pressed ferrite material.

EXAMPLE 3

Another magnetic head $H_3$ was made in the aforesaid shape by slicing, polishing, and glass-bonding the hot-pressed oriented polycrystalline ferrite obtained in Example 1. The front face 7 of the head $H_3$ was aligned perpendicular to the substantially oriented (111)-crystal planes and the running direction of the magnetic tape was perpendicular to the substantially oriented (111)-crystal planes in the material of the head as shown in FIG. 4.

A wear test was carried out by the aforesaid testing method. The wear resistance of the magnetic head was about 7.5. This value and that in Example 2 prove that the head made of the crystalline oriented polycrystalline ferrite material of this invention is superior in wear resistance by about two-fold to a head made of the usual ferrite material (3.8 as described above).

EXAMPLE 4

Still another head $H_4$ was made in the aforesaid shape by slicing, polishing and glass-bonding the ferrite obtained in Example 1. The front surface was aligned substantially parallel to the (111)-places of the material of the head as shown in FIG. 4. A wear test was carried out by the testing method described above. The degree of material crumbling after a 300 hour-testing period was evaluated by measuring the number and average size of the defects.

The total number in defects of the head was about 60 and the average size about 2$\mu$ while for a head made of a conventional polycrystalline ferrite the total number of defects was about 110 and the average size about 8$\mu$.

EXAMPLE 5

A pressed body prepared in the same way as described in Example 1 was tightly wrapped in a thin rubber film and was put into a high pressure vessel. The pressed and wrapped body was further compacted into a dense compacted body by a hydraulic pressure of 3000kg/cm$^2$. The compacted body was heated to 1400°C and sintered for 3 hours in a $N_2$-gas atmosphere and then furnace-cooled in the $N_2$-gas atmosphere to room temperature. The thus obtained sintered body had a porosity of about 1%, an average grain size of about 25μ and a degree of (111)-orientation of 80%.

EXAMPLE 6

Starting materials with the composition described in Example 1 were mixed homogeneously without adding any water or alcohol. The mixture was molded and hot-pressed in the same manner as described in Example 1. The obtained sintered body had a porosity of about 0.2%, an average grain size of 90μ and a degree of the (111)-orientation Q of 99%.

EXAMPLE 7

Mixtures of ferrite compositions shown in Table 1 were prepared in the same manner as described in Example 1. Average grain sizes of $MnCO_3$ and NiO were about 0.05μ and 0.1μ, respectively. Other starting materials were the same as the ones used in Example 1. Hot-pressing conditions were adjusted so that average grain sizes of the hot-pressed materials were between 90μ and 130μ except the first and the last two runs in Table 1 which had average grain sizes between 30μ and 40μ.

EXAMPLE 8

A mixture of ferrite composition was prepared in the same manner as described in Example 1. The average grain size of the MIO powder used in this Example was about 10μ. Sintered bodies were prepared in the same manner as described in Example 1 except for the hot-pressing conditions. Hot-pressing conditions were adjusted so as to obtain sintered bodies having various average grain sizes.

Table 2.

| Sample No. | Hot-pressing temperature (°C) | Hot-pressing time period (hr.) | Porosity (%) | Average grain size(μ) | Degree of orientation (%) | Wear resistance |
|---|---|---|---|---|---|---|
| 8-1 | 1250 | 3 | ~0.1 | 20 | 75 | 5 |
| 8-2 | 1300 | 3 | ~0.1 | 30 | 85 | 6.2 |
| 8-3 | 1325 | 3 | ~0.1 | 70 | 98 | 7.5 |
| 8-4 | 1350 | 3 | <0.1 | 100 | 100 | 7.5 |

Table 2 shows the porosity, average grain size, degree of orientation and wear resistance of sintered bodies prepared under various hot-pressing conditions. The wear resistance was figured out in the same manner as described in Example 3. It is clearly indicated in Table 2 that a sintered body consisting of larger grains generally has a better orientation and a better wear resistance.

EXAMPLE 9

Dense sintered bodies were prepared in the manner described in Example 1. For the first two runs a uniaxial pressure of 2000kg/cm² was used instead of 500 kg/cm². In this Example MIO powders having various grain sizes were used for adjusting the degree of orientation of the sintered ferrite body. Average grain sizes of the MIO powders and of the obtained ferrite bodies are listed in Table 3. The porosities of these ferrites were less than 0.2%.

Table 1

| Sample No. | Amount of MIO (%) | Amount of ZnO (%) | Amount of γ-MnOOH (%) | Amount of $MnCo_3$ (%) | Amount of NiO (%) | Degree of orientation (%) | Average grain size of ferrite body (μ) |
|---|---|---|---|---|---|---|---|
| 7-1 | 65 | 35 | — | — | — | 71 | 30 |
| 7-2 | 65 | 25 | 10 | — | — | 99 | 100 |
| 7-3 | 65 | 15 | 20 | — | — | 100 | 130 |
| 7-4 | 55 | 35 | 10 | — | — | 90 | 90 |
| 7-5 | 55 | 25 | 20 | — | — | 94 | 120 |
| 7-6 | 55 | 35 | — | 10 | — | 75 | 90 |
| 7-7 | 55 | 25 | — | 20 | — | 80 | 110 |
| 7-8 | 65 | 25 | 10 | — | — | 93 | 100 |
| 7-9 | 65 | 15 | — | 20 | — | 90 | 110 |
| 7-10 | 65 | 20 | — | — | 15 | 70 | 30 |
| 7-11 | 65 | 20 | 5 | — | 10 | 76 | 40 |

In Table 1, the amounts of the starting materials are listed in weight percentage and the ratios are given on the basis of 100% purity.

Table 3.

| Sample No. | Average grain size of MIO (μ) | Average grain size of ferrite body (μ) | Degree of orientation(%) |
|---|---|---|---|
| 9-1 | 0.3 | 120 | 95 |
| 9-2 | 0.5 | 110 | 99 |
| 9-3 | 2 | 130 | 100 |
| 9-4 | 5 | 130 | 100 |
| 9-5 | 10 | 100 | 100 |
| 9-6 | 15 | 110 | 99 |
| 9-7 | 30 | 75 | 95 |
| 9-8 | 60 | 70 | 70 |

EXAMPLE 10

Cold-pressed bodies were prepared in the way described in Example 1. In this Example, however, the starting materials were the MIO powder having an average grain size of $15\mu$ and one of the compounds M selected from the group consisting of $\alpha$-FeOOH, Ni(OH)$_2$, Mg(OH)$_2$ and Co(OH)$_2$. The $\alpha$-FeOOH powder has a needle-like shape and the other powders have a thin hexagonal disc shape. For making the ferrite Fe$_3$O$_4$ sintering was carried out in a reducing atmosphere and for all of the rest cold-pressed bodies were hot-pressed in the manner described in Example 1. The results thus obtained are tabulated in Table 4.

Table 4.

| Sample No. | Ferrite | Compound M | Average grain size of M ($\mu$) | porosity (%) | Average grain size ($\mu$) | Degree of orientation (%) |
|---|---|---|---|---|---|---|
| 10-1 | Fe$_3$O$_4$ | $\alpha$-FeOOH | 1.0 | 2 | 20 | 73 |
| 10-2 | NiFe$_2$O$_4$ | Ni(OH)$_2$ | 0.3 | <0.2 | 75 | 90 |
| 10-3 | MgFe$_2$O$_4$ | Mg(OH)$_2$ | 0.5 | <0.2 | 70 | 77 |
| 10-4 | CoFe$_2$O$_4$ | Co(OH)$_2$ | 0.3 | <0.2 | 70 | 85 |

What is claimed is:

1. A magnetic head comprising a magnetic core having a winding wound thereon, said magnetic core being a ferrite body having the shape of the core and being composed of crystallites which have the (111)-crystallographic planes thereof substantially oriented parallel with each other.

2. A magnetic head as claimed in claim 1, wherein said magnetic head has a surface adapted to be contacted by a recording medium when the head is in use, said surface being substantially perpendicular to said substantially oriented (111)-planes.

3. A magnetic head as claimed in claim 2, wherein said (111)-planes are substantially perpendicular to the direction in which the recording medium runs across said surface.

4. A magnetic head as claimed in claim 2, wherein said (111)-planes are substantially parallel to the direction in which the recording medium runs across said surface.

5. A magnetic head as claimed in claim 1, wherein said magnetic head has a surface adapted to be contacted by a recording medium when the head is in use, said surface being substantially parallel to said substantially oriented (111)-planes.

6. A magnetic head as claimed in claim 1 in which said crystallites are of $\alpha$-Fe$_2$O$_3$.

7. A method of making a ferrite body composed of crystallites which have the (111)-crystallographic planes thereof substantially oriented parallel with each other and from which a magnetic core for use in a magnetic head for recording on and reproducing from a magnetic medium can be exsected by conventional cutting, polishing, and like steps, the method comprising the steps of mixing starting materials consisting of an $\alpha$-Fe$_2$O$_3$ powder in an amount of at least 55% by weight the particles of which have a thin disc shape and the balance conventional compounds for forming a ferrite composition, cold-pressing the mixture into a cold-pressed body by a uniaxial pressure and sintering said cold-pressed body into a solid body, whereby crystallites of the sintered body have said (111)-planes substantially oriented.

8. A method of making a ferrite body as claimed in claim 7, wherein said $\alpha$-Fe$_2$O$_3$ powder has an average grain size ranging from $0.1\mu$ to $60\mu$.

9. A method of making a ferrite body as claimed in claim 7, wherein said $\alpha$-Fe$_2$O$_3$ powder has an average grain size ranging from $0.1\mu$ to $30\mu$.

10. A method of making a ferrite body as claimed in claim 7, wherein said $\alpha$-Fe$_2$O$_3$ powder has an average grain size ranging from $0.5\mu$ to $15\mu$.

11. A method of making a ferrite body as claimed in claim 7, wherein said balance of said starting materials include at least one compound selected from the group consisting of decomposed materials of $\gamma$MnOOH, $\alpha$-FeOOH, Co(OH)$_2$, Mg(OH)$_2$ and Ni(OH)$_2$.

12. A method of making a ferrite body as claimed in claim 7, wherein said cold-pressed body is sintered under conditions so as to produce a sintered body having an average grain size at least 2-times larger than that of said $\alpha$-Fe$_2$O$_3$ powder.

13. A method of making a ferrite body as claimed in claim 7, wherein said cold-pressed body is hot-pressed by applying a uniaxial pressure in a direction coinciding substantially with the direction of said uniaxial pressure of cold-pressing.

14. A method of making a ferrite body as claimed in claim 7, wherein the step of mixing said starting materials further comprises mixing them with water or alcohol in a volume more than total volume of said starting materials.

15. A method of making a ferrite body as claimed in claim 7, wherein said cold-pressed body is further compacted into a denser body, before the sintering step, by applying high isostatic pressure.

16. A method of making a ferrite body as claimed in claim 7, wherein said balance of said starting materials starting materials include at least one compound selected from the group consisting of $\gamma$-MnOOH, $\alpha$-FeOOH, Co(OH)$_2$, Mg(OH)$_2$ and Ni(OH)$_2$.

17. A method of making a ferrite body as claimed in claim 16, wherein said $\alpha$-Fe$_2$O$_3$ powder and said at least one compound selected from the group consisting of $\gamma$-MnOOH, $\alpha$-FeOOH, Co(OH)$_2$, Mg(OH)$_2$ and Ni(OH)$_2$ are present in said starting materials in weight not less than 65 percent of said starting materials.

18. A method of making a magnetic head, comprising making a ferrite body composed of crystallites which have the (111)-crystallographic planes thereof substantially oriented parallel with each other by the steps of mixing starting materials consisting of an $\alpha$-Fe$_2$O$_3$ powder the particles of which have a thin disc shape and the balance other conventional compounds for forming a ferrite composition in a weight ratio of a ferrite composition, cold-pressing the mixture into a cold-pressed body by a uniaxial pressure and sintering said cold-pressed body into a solid body, whereby crystallites of the sintered body have said (111)-planes substantially oriented, and exsecting from said solid body a magnetic head having a surface adapted to be contacted by a recording medium when the head is in use, said surface being substantially parallel to said substantially oriented (111)-planes.

19. A method of making a magnetic head, comprising making a ferrite body composed of crystallites which have the (111)-crystallographic planes thereof substantially oriented parallel with each other by the steps of mixing starting materials consisting of an $\alpha$-$Fe_2O_3$ powder the particles of which have a thin disc shape and the balance other conventional compounds for forming a ferrite composition in a weight ratio of a ferrite composition, cold-pressing the mixture into a cold-pressed body by a uniaxial pressure and sintering said cold-pressed body into a solid body, whereby crystallites of the sintered body have said (111)-planes substantially oriented, and exsecting from said solid body a magnetic head having a surface adapted to be contacted by a recording medium when the head is in use, said surface being sutstantially perpendicular to said substantially oriented (111)-planes.

20. A ferrite body for a magnetic core for use in a magnetic head, said ferrite body being composed of crystallites which have the (111)-crystallographic planes thereof substantially oriented parallel with each other.

21. A ferrite body as claimed in claim 20 in which said crystallites are of $\alpha$-$Fe_2O_3$.

* * * * *